3,062,827
5-(3',5'-DIALKYLPHENOXYMETHYL)-2-OXAZOLIDONES
Carl D. Lunsford, Richmond, Va., assignor to A. H. Robins Company, Inc., Richmond, Va., a corporation of Virginia
No Drawing. Filed June 19, 1959, Ser. No. 821,357
2 Claims. (Cl. 260—307)

The present invention relates to certain 5-(3',5'-dialkylphenoxymethyl)-2-oxazolidones and is more particularly concerned with such compounds which are useful as interneuronal blocking agents or depressants of central synaptic transmission.

The compounds of the present invention have the general formula:

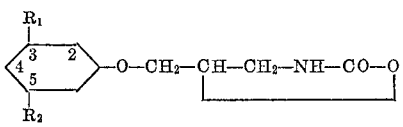

wherein $R_1$ and $R_2$ are alkyl radicals which contain not more than three carbon atoms each.

These compounds of the present invention, characterized by the presence of specific substituents in specific positions on the phenyl ring have been found to have superior activity of the aforementioned type and to be able to block abnormal nervous impulses which give rise to spasm. They show high activity in standard testing procedures. They are especially active against strychnine-induced convulsions. This activity is indicative of ultimate anticonvulsant, relaxant, tranquilizing and similar clinical use in human beings.

The activity of the compounds of the invention is surprisingly superior to that of the known, and previously most active, 2-mono-substituted phenoxymethyl oxazolidones of an otherwise similar structure, and is correlated with their structural specificity. Clinical evaluation of some of the more outstanding of the compounds is presently under way. The fact that some of the compounds possess superior anticonvulsant activity of one specific type, in a far greater measure than anticonvulsant activity of other types, makes them particularly useful in instances where specificity of treatment, rather than general anticonvulsant therapy, is indicated or desirable, and makes possible a directed approach, using the compounds of the invention, to specific interneuronal or synaptic target organs or areas. While the compounds do differ among themselves in the magnitude of their respective activities, they are generally characterized by the type and measure of activity indicated in the foregoing.

It is accordingly an object of the present invention to provide certain 5-(3',5'-dialkylphenoxymethyl)-2-oxazolidones having the foregoing structure and utility. Other objects will become apparent hereinafter.

"Alkyl," where this term is used in the text and formulae herein, includes straight and branched-chain radicals such as methyl, ethyl, and propyl.

The 5-(3',5'-dialkylphenoxymethyl)-2-oxazolidones of the invention may be prepared in a number of ways. For example, they may be prepared by reacting a selected 3-phenoxy-1,2-propanediol (having the predetermined substituents on the phenyl ring) and urea, preferably in an approximately 1:2 molar ratio, by heating at an elevated temperature, usually 170° C. to 200° C. and preferably at about 185° C., with or without a solvent. A fusion process is preferably employed. The time required for complete reaction is usually at least three hours and the technique of rapidly heating the reaction mixture to the desired reaction temperature is advantageously followed. On completion of the reaction, the crude oxazolidone may be dissolved in a suitable solvent and recovered therefrom for purification purposes by usual procedure. Alternatively, a selected 3-phenoxy-1-chloro-2-propanol may be reacted with urea instead of the phenoxy-1,2-propanediol, using the same molar ratios and under the same reaction conditions.

Moreover, the 5-(3',5'-dialkylphenoxymethyl)-2-oxazolidones may also be prepared by reacting a selected 3-phenoxy-2-hydroxy-1-propyl-carbamate and urea, preferably in approximately equimolar quantities, at elevated temperatures, advantageously by heating the reactants together in the temperature range of 170° to 200° C., usually for periods as long as five hours for completion of the reaction, and separating the crude oxazolidone. The pure oxazolidone may be obtained by fractional distillation or by crystallization from an oxygenated solvent. The carbamate starting material may in turn be prepared according to known procedure by reacting the selected phenoxy-1,2-propanediol with an equimolar quantity of phosgene in the cold in the presence of an organic amine base, such as pyridine or dimethyl aniline, to produce an intermediate chlorocarbonate compound, which is then reacted with ammonium hydroxide to yield the desired starting carbamate.

The following examples are given by way of illustration only, and are not to be construed as limiting.

*Example 1.—5-(3',5'-Dimethylphenoxymethyl)-2-Oxazolidone*

Urea (118 grams, 1.96 moles) was added to 192 grams (0.98 mole) of 3-(3',5'-dimethylphenoxy)-1,2-propanediol which had previously been heated to 150° C. The reaction mixture was then heated rapidly to 195-200° C. and maintained at this temperature for five hours with constant stirring. The resulting mixture was partitioned between water and ethyl acetate and the ethyl acetate layer was dried over sodium sulfate and concentrated. The residue was distilled in vacuo and the fraction boiling at 220-225° C./1.5 mm. was collected. Yield, 172 grams (79%). The distillate was crystallized from dry ethyl acetate; melting point, 121.5–123° C.

*Analysis.*—Calculated for $C_{12}H_{15}NO_3$: N, 6.33. Found: N, 6.03.

*Example 2.—5-(2',3',5'-Trimethylphenoxymethyl)-2-Oxazolidone*

This compound was prepared by the same procedure as that outlined in Example 1, employing 3-(2',3',5'-trimethylphenoxy)-1,2-propanediol and urea as starting materials. It was distilled at a temperature of 210-225° C./0.07-0.60 mm. The yield was 60% and the melting point was 125–126° C. after crystallization from dry ethyl acetate.

*Analysis.*—Calculated for $C_{13}H_{17}NO_3$; N, 5.95. Found: N, 5.75.

*Example 3.—5-(3',5'-Dipropylphenoxymethyl)-2-Oxazolidone*

In the manner of Example 1, 5-(3',5'-dipropylphenoxymethyl)-2-oxazolidone is prepared by reacting 3-(3',5'-dipropylphenoxy)-1,2-propanediol (or the corresponding 1-chloro-2-propanol or 2-hydroxy-1-propyl-carbamate) with urea and separating, working up the product, and purifying it in the usual manner.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. 5 - (3',5' - di - lower - alkylphenoxymethyl) - 2- oxazolidone, wherein each lower-alkyl group contains a maximum of three carbon atoms.

2. 5-(3',5'-dimethylphenoxymethyl)-2-oxazolidone.

References Cited in the file of this patent

UNITED STATES PATENTS 2,895,960    Lunsford _____ July 21, 1959

FOREIGN PATENTS

42986/58    Australia _____ May 7, 1959

OTHER REFERENCES

Lynn: Organic Chemistry (Lea et al., 3rd ed.), pages 186–189 (1948).

Blajot et al.: 743 O.G. 933, June 23, 1959 (filed May 26, 1958).

Beasley et al.: Chem. Abstr., vol. 51, col. 8723, 1957 (abstr. of J. Pharm. and Pharmacol., vol. 9, pp. 10–19 (1957)).